(12) United States Patent
Lin

(10) Patent No.: US 11,880,579 B2
(45) Date of Patent: Jan. 23, 2024

(54) DATA MIGRATION METHOD AND APPARATUS

(71) Applicant: Huawei Technologies Co., Ltd., Shenzhen (CN)

(72) Inventor: Yu Lin, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/183,045

(22) Filed: Feb. 23, 2021

(65) Prior Publication Data

US 2021/0173579 A1 Jun. 10, 2021

Related U.S. Application Data

(63) Continuation of application No. PCT/CN2019/079411, filed on Mar. 25, 2019.

(30) Foreign Application Priority Data

Aug. 24, 2018 (CN) .......................... 201810972007.8

(51) Int. Cl.
*G06F 12/00* (2006.01)
*G06F 3/06* (2006.01)

(52) U.S. Cl.
CPC ............ *G06F 3/0647* (2013.01); *G06F 3/067* (2013.01); *G06F 3/0619* (2013.01); *G06F 3/0653* (2013.01); *G06F 3/0659* (2013.01); *G06F 3/0683* (2013.01)

(58) Field of Classification Search
CPC .... G06F 3/0619; G06F 3/0647; G06F 3/0653; G06F 3/0659; G06F 3/067; G06F 3/0683

USPC .......................................................... 711/154
See application file for complete search history.

(56) References Cited

U.S. PATENT DOCUMENTS

| | | | | |
|---|---|---|---|---|
| 8,306,950 | B2* | 11/2012 | Adkins | G06F 16/2365 |
| | | | | 709/216 |
| 8,392,668 | B2* | 3/2013 | Reuter | G06F 3/0637 |
| | | | | 709/213 |
| 9,280,289 | B1* | 3/2016 | Ramdass | G06F 3/061 |
| 2010/0281230 | A1 | 11/2010 | Rabii et al. | |

(Continued)

FOREIGN PATENT DOCUMENTS

| CN | 101223498 A | 7/2008 |
|---|---|---|
| CN | 103473298 A | 12/2013 |

(Continued)

*Primary Examiner* — Mohamed M Gebril
(74) *Attorney, Agent, or Firm* — Leydig, Voit & Mayer, Ltd.

(57) ABSTRACT

A data migration method and a storage device are provided. The device obtains data access temperature of a first storage unit group, which is determined by data access temperature of each storage unit, and the data access temperature of each storage unit is determined by a logical unit in which the storage unit is located. When the data access temperature of the first storage unit group reaches a specified threshold, the storage device migrates data in the first storage unit group to a second storage unit group. Access performance of the second storage unit group is higher than access performance of the first storage unit group. According to this application, accuracy of collecting statistics about data access temperature can be improved, thereby improving hierarchical storage performance of a storage device.

16 Claims, 4 Drawing Sheets

(56) References Cited

U.S. PATENT DOCUMENTS

| | | | |
|---|---|---|---|
| 2011/0167217 A1 | 7/2011 | Montgomery | |
| 2011/0185120 A1 | 7/2011 | Jess | |
| 2011/0208938 A1 | 8/2011 | Carr et al. | |
| 2011/0225347 A1* | 9/2011 | Goss | G06F 12/0246 711/170 |
| 2012/0011315 A1* | 1/2012 | Ishizaki | G06F 3/0689 711/E12.016 |
| 2013/0013885 A1* | 1/2013 | Teo | G06F 12/06 711/E12.078 |
| 2013/0080700 A1* | 3/2013 | Yoshida | G06F 8/654 711/E12.001 |
| 2013/0290598 A1 | 10/2013 | Fiske et al. | |
| 2013/0339601 A1* | 12/2013 | Goel | G06F 11/1096 711/114 |
| 2014/0025864 A1* | 1/2014 | Zhang | G06F 12/0246 711/103 |
| 2014/0258788 A1* | 9/2014 | Maruyama | G06F 11/3452 714/47.3 |
| 2014/0297909 A1* | 10/2014 | Aiura | G06F 3/0631 710/74 |
| 2015/0113223 A1* | 4/2015 | Brown | G06F 12/0893 711/133 |
| 2016/0378773 A1* | 12/2016 | Vaghani | G06F 3/0683 711/114 |
| 2017/0031606 A1* | 2/2017 | Luan | G06F 3/0611 |
| 2017/0075768 A1 | 3/2017 | Oberhofer et al. | |
| 2017/0228163 A1 | 8/2017 | Kraemer et al. | |
| 2017/0235950 A1* | 8/2017 | Gopalapura Venkatesh | G06F 3/0647 726/24 |
| 2019/0220214 A1* | 7/2019 | Mio | G06F 3/0683 |
| 2021/0173579 A1* | 6/2021 | Lin | G06F 3/0616 |

FOREIGN PATENT DOCUMENTS

| | | |
|---|---|---|
| CN | 103827970 A | 5/2014 |
| CN | 105138416 A | 12/2015 |
| CN | 105808443 A | 7/2016 |
| CN | 106612619 A | 5/2017 |
| CN | 107301134 A | 10/2017 |
| CN | 108121501 A | 6/2018 |

* cited by examiner

DATA MIGRATION METHOD AND APPARATUS

CROSS-REFERENCE TO RELATED APPLICATIONS

This application is a continuation of International Application No. PCT/CN2019/079411, filed on Mar. 25, 2019, which claims priority to Chinese Patent Application No. 201810972007.8 filed on Aug. 24, 2018. The disclosures of the aforementioned applications are hereby incorporated by reference in their entireties.

TECHNICAL FIELD

Embodiments of this application relate to the field of storage technologies, and in particular, to a data migration method and an apparatus.

BACKGROUND

In the field of storage technologies, data may be stored in a hierarchical manner during data storage, to improve storage performance. During hierarchical storage, data may be stored on storage devices with different performance, thereby reducing space occupied by non-critical data on a high-performance disk. With the hierarchical storage, data can be automatically migrated between storage space, thereby achieving better storage performance. One factor that affects data migration is statistical information of a storage unit. The statistical information may include, for example, data access temperature. The data access temperature may be determined by a quantity of times of reading or writing data stored in the storage unit.

In a hierarchical storage technology, data may be migrated in a form of storage unit groups, and a storage unit group may include a plurality of storage units, a storage device may determine, based on data access temperature of the storage unit groups, to migrate data to a storage unit group with higher data access performance or migrate data to a storage unit group with lower data access performance. When statistics about data access temperature is collected, how to ensure accuracy of collecting statistics about data access temperature of a storage unit group is an issue to be urgently resolved.

SUMMARY

This application discloses a data migration method and an apparatus, to improve accuracy of collecting statistics about data access temperature, thereby improving hierarchical storage performance of a storage device.

According to a first aspect, an implementation of this application provides a data migration method. The method includes: obtaining, by a storage device, data access temperature of a first storage unit group, where the first storage unit group includes a plurality of storage units, each storage unit is a composition unit of a block included in a logical unit, the logical unit is logical storage space that is provided by the storage device and that is accessible by a host, the data access temperature of the first storage unit group is determined by data access temperature of each storage unit, and the data access temperature of each storage unit is determined by a logical unit in which the storage unit is located; and when the data access temperature of the first storage unit group reaches a specified threshold, migrating, by the storage device, data in the first storage unit group to a second storage unit group, where access performance of the second storage unit group is higher than access performance of the first storage unit group.

In the foregoing data migration method, data access temperature of a storage unit of a block included in the logical unit is determined by collecting statistics about data access temperature of the block included in the logical unit. The data access temperature of the storage unit group may be determined based on the data access temperature of each storage unit included in the storage unit group. In this way, the determined data access temperature of the storage unit group can reflect a data access frequency of the storage unit group more accurately, thereby improving accuracy of collecting statistics about the data access temperature of the storage unit group and improving hierarchical storage performance of the storage device.

The block included in the logical unit may be an LUN block.

In a possible implementation, the storage device collects statistics about the data access temperature in a form of blocks included in the logical unit.

Specifically, the data access temperature of the first storage unit group is determined in the following steps. Step 1: The storage device collects statistics about data access frequencies of all LUN blocks. Step 2: The storage device determines data access temperature of each LUN block based on a data access frequency of each LUN block. Step 3: The storage device determines data access temperature of a storage unit included in each LUN block. Step 4: For each storage unit group, the storage device determines data access temperature of a storage unit group based on data access temperature of each storage unit included in the storage unit group.

Optionally, the data access temperature of the LUN block may also be obtained by directly collecting statistics for the LUN block. For example, statistics about the data access frequency of the LUN block is directly collected as the data access temperature of the LUN block. In other words, after step 1 is performed, step 2 does not need to be performed, and step 3 is directly performed based on the obtained data access temperature.

In the foregoing data migration method, hot data frequently accessed by a user may be stored in a low-latency and high-speed storage medium, and cold data rarely accessed may be stored in a high-latency and low-cost storage medium, so that disk utilization can be improved through hierarchical storage. In addition, the data access temperature of the LUN block is determined by collecting statistics about the data access frequency of the LUN block, and then the data access temperature of the storage unit that forms the LUN block is determined based on the data access temperature of the LUN block. The data access temperature of the storage unit group may be determined based on the data access temperature of each storage unit included in the storage unit group. In this way, the determined data access temperature of the storage unit group can more accurately reflect a data access frequency of the storage unit group, and can improve data migration appropriateness, thereby improving hierarchical storage performance of the storage device.

In a possible implementation, the first storage unit group includes a first storage unit, and the method further includes: receiving, by the storage device, a data write request, where the data write request is used to write data into a second storage unit, and a storage unit group to which the second storage unit belongs is different from the first storage unit group; writing, by the storage device, the data into the first storage unit, and storing a correspondence between an actual address of the data and a logical address of the first storage unit; and the obtaining, by a storage device, data access temperature of a first storage unit group includes: updating, by the storage device, data access temperature of the first storage unit based on data access temperature of the second storage unit; and obtaining, by the storage device, the data access temperature of the first storage unit group based on updated data access temperature of the first storage unit.

In the foregoing ROW scenario, the data access temperature of the redirected-to first storage unit may use the data access temperature of the second storage unit that is used before redirection. The data access temperature of the storage unit group in which the first storage unit is located is updated based on the used data access temperature of the first storage unit. Whether the data is migrated is determined based on the updated data access temperature of the storage unit group. The method for determining the data access temperature of the storage unit group may avoid inaccurate data access temperature, caused by the ROW, of the storage unit group in which the first storage unit is located. This ensures that statistics about the data access temperature of the storage unit group is collected more accurately, and can improve data migration appropriateness, thereby improving hierarchical storage performance of the storage device.

In a possible implementation, a third storage unit group includes the second storage unit, and the method further includes: when the second storage unit is released, resetting, by the storage device, the data access temperature of the second storage unit; obtaining, by the storage device, data access temperature of the third storage unit group based on reset data access temperature of the second storage unit; and when the data access temperature of the third storage unit group reaches a specified threshold, migrating, by the storage device, data in the third storage unit group to a fourth storage unit group. Access performance of the fourth storage unit group is higher than access performance of the third storage unit group. After the data in the storage unit in the storage unit group is released, the data access temperature of the redirected storage unit is reset, and the data access temperature of the storage unit group in which the storage unit is located is updated based on the reset data access temperature of the storage unit. The method for determining the data access temperature of the storage unit group may avoid inaccurate data access temperature of the storage unit group caused by releasing the data in the storage unit. This ensures that statistics about the data access temperature of the storage unit group is collected more accurately, and can improve data migration appropriateness, thereby improving hierarchical storage performance of the storage device.

According to a second aspect, this application provides a storage device. The storage device includes at least one controller and a plurality of solid state disks. The controller is connected to a host by using a storage area network, to receive an I/O request from the host. The controller may store data carried in the I/O request, and write the data into the solid-state disk. The controller is configured to invoke a program instruction to perform the method described in any one of the first aspect or the possible implementations of the first aspect.

Specifically, the controller may include one or more interface cards and processors. The interface card is configured to communicate with the host, and the controller may receive an operation instruction of the host by using the interface card. The controller may send a data write instruction to the solid-state disk for storage by using the interface card.

Optionally, the controller may further include a memory. The memory is configured to temporarily store data received from the host or data read from the solid-state disk. When receiving a plurality of data write instructions sent by the host, the controller may temporarily store data in the plurality of data write instructions into the memory. When a capacity of the memory reaches a specific threshold, the data stored in the memory and a logical address allocated for the data are sent to the solid-state disk, and the solid-state disk stores the data. The memory may further include program code, and the processor may invoke the program code to perform the method described in any one of the first aspect or the possible implementations of the first aspect.

According to a third aspect, this application provides a controller. The controller is used by the storage device described in the second aspect. The controller includes a processor and a memory, the memory is configured to store a program instruction, and the processor is configured to invoke the program instruction to perform the method described in any one of the first aspect or the possible implementations of the first aspect.

According to a fourth aspect, this application provides a storage device, including modules or units configured to perform the method provided in any one of the first aspect or the possible implementations of the first aspect.

According to a fifth aspect, this application provides a controller, including modules or units configured to perform the method provided in any one of the first aspect or the possible implementations of the first aspect.

According to a sixth aspect, the application provides a chip system. The chip system includes at least one processor, a memory, and an interface circuit. The memory, the interface circuit, and the at least one processor are interconnected by using a line, and the at least one memory stores a program instruction. When the program instruction is executed by the processor, the method described in any one of the first aspect or the possible implementations of the first aspect is implemented.

According to a seventh aspect, an implementation of the application provides a computer readable storage medium. The computer readable storage medium stores a program instruction. When the program instruction is run by a processor, the method described in any one of the first aspect or the possible implementations of the first aspect is implemented.

According to an eighth aspect, an implementation of the application provides a computer program product. When the computer program product is run on a processor, the method described in any one of the first aspect or the possible implementations of the first aspect is implemented.

BRIEF DESCRIPTION OF DRAWINGS

The following describes the accompanying drawings used in implementations of this application.

DESCRIPTION OF IMPLEMENTATIONS

The following describes the implementations of this application with reference to the accompanying drawings in the implementations of this application. Terms used in implementations of the implementations of this application are merely used to explain the specific implementations of this application, and are not intended to limit this application.

First, an application scenario in the implementations of this application is described. In the field of storage technologies, a storage device may use a redundant array of independent disk (RAID) to store data on hard disks with different performance, so that the storage device stores the data in a hierarchical manner. Specifically, the storage device may include both a high-performance storage medium (for example, a solid state drives (SSD) and a low-cost and low-performance storage medium (for example, a serial advanced technology attachment (SATA) disk or a serial attached small computer system interface (SAS) disk). When the hard disks are used, utilization of the hard disks can be improved through the hierarchical storage. To be specific, hot data frequently accessed by a user is stored in a low-latency and high-speed storage medium, and rarely accessed cold data is stored in a high-latency and low-cost storage medium. To implement the hierarchical storage, the storage device may periodically obtain data access temperature of each storage unit group in the disk at a granularity of a storage unit group. Then, based on the data access temperature of each storage unit group, the hot data is migrated to the low-latency and high-speed storage medium, and the cold data is migrated to the high-latency and low-cost storage medium.

Second, implementation a system architecture in the implementations of this application is described to facilitate understanding of the implementations of this application.

Figure 1:
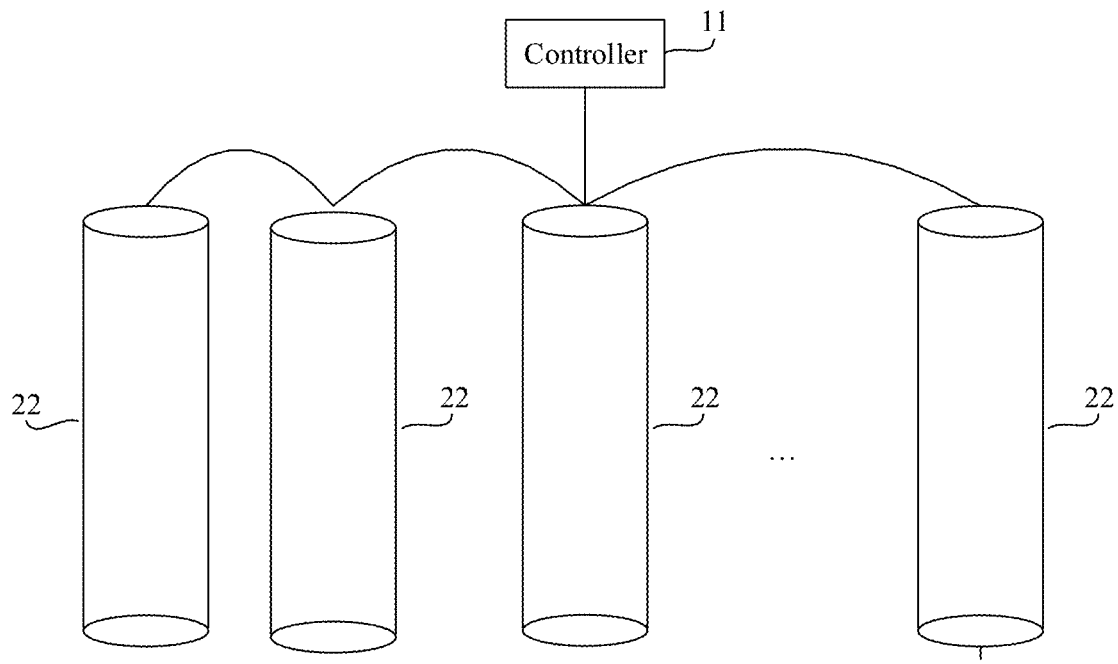
FIG. 1 is a schematic structural diagram of a storage device according to an implementation of this application.

FIG. 1 is a schematic structural diagram of a storage device according to an implementation of this application. The storage device shown in FIG. 1 includes at least one controller (for example, a controller 11 shown in FIG. 1) and a plurality of solid-state disks 22. The controller 11 is connected to a host (not shown in the figure) by using a storage area network (SAN). The controller 11 may be a computing device, for example, a server or a desktop computer. An operating system and an application program are installed on the controller 11. The controller 11 may receive an input/output (I/O) request from the host. The controller 11 may further store data (if any) carried in the I/O request, and write the data into the solid-state disk 22. The solid-state disk (SSD) is a memory that uses a flash memory chip as a medium, and is also referred to as a solid-state drive (SSD).

FIG. 1 is described merely as an example. In actual application, the storage device may include two or more controllers. A physical structure and a function of each controller are similar to those of the controller 11. In addition, modes of connections between the controllers and between any controller and the solid-state disk 22 are not limited in this implementation, provided that the controllers can communicate with each other and that the controller and the solid-state disk 22 can communicate with each other. In addition, in this implementation, when sending an instruction to the solid-state disk, the controller 11 usually sends the instruction to a plurality of solid-state disks. For ease of description, a set including the plurality of solid-state disks 22 is referred to as a solid-state disk group.

Figure 2:
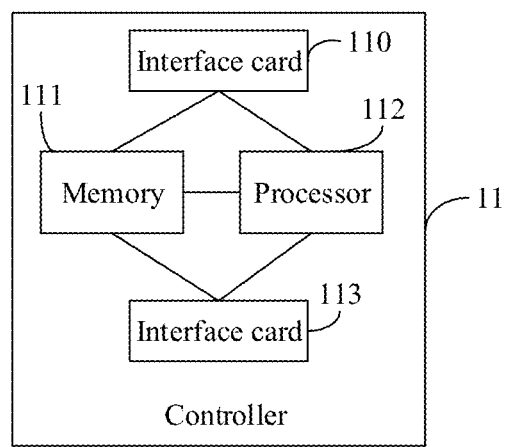
FIG. 2 is a schematic structural diagram of a controller according to an implementation of this application.

FIG. 2 is a schematic structural diagram of a controller 11 according to an implementation of this application. As shown in FIG. 2, the controller 11 includes an interface card 110, a processor 112, and an interface card 113.

The interface card 110 is configured to communicate with a host. The controller 11 may receive an operation instruction of the host by using the interface card 110. The processor 112 may be a central processing unit (CPU). In this implementation of the application, the processor 112 may be configured to receive an I/O request from the host and process the I/O request. The I/O request may be a data write instruction or a data read instruction, and the processor 112 may further send data in the data write instruction to the solid-state disk 22. In addition, the processor 112 may further be configured to perform a system garbage collection operation. The interface card 113 is configured to communicate with the solid-state disk 22. The controller 11 may send, by using the interface card 113, the data write instruction (including data and a life cycle level of the data) to the solid-state disk 22 for storage.

Optionally, the controller 11 may further include a memory 111. The memory 111 is configured to temporarily store data received from the host or data read from the solid-state disk 22. When receiving a plurality of data write instructions sent by the host, the controller 11 may temporarily store data in the plurality of data write instructions into the memory 111. When a capacity of the memory 111 reaches a specific threshold, the data stored in the memory 111 and a logical address allocated for the data are sent to the solid-state disk 22. The solid-state disk 22 stores the data. The memory 111 includes a volatile memory, a flash memory chip, or a combination thereof. The volatile memory is, for example, a random-access memory (RAM). The flash memory chip is a machine readable medium capable of storing program code, such as a floppy disk, a hard disk, a solid-state disk (SSD), or an optical disc. The memory 111 has a power-failure protection function. The power-failure protection function means that data stored in the memory 111 is not lost even when a system is powered on again after a power failure.

Figure 4:
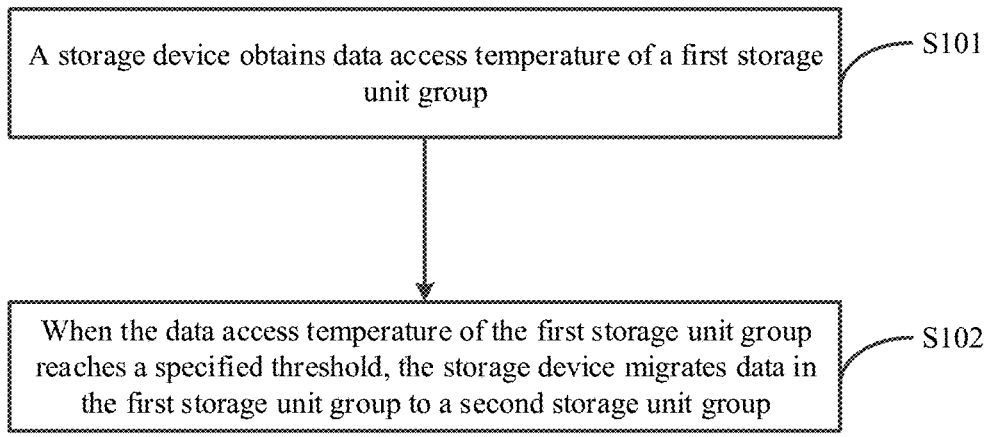
FIG. 4 is a schematic flowchart of a data migration method according to an implementation of this application.

The controller 11 is further configured to perform the data migration method provided in this implementation of this application, to be specific, a data migration method described in FIG. 4.

It should be noted that the controller 11 is a system controller. The system controller is an independent device, and is different from a control chip in the solid-state disk. In this implementation, the control chip in the solid-state disk is referred to as a flash memory controller.

Figure 3:
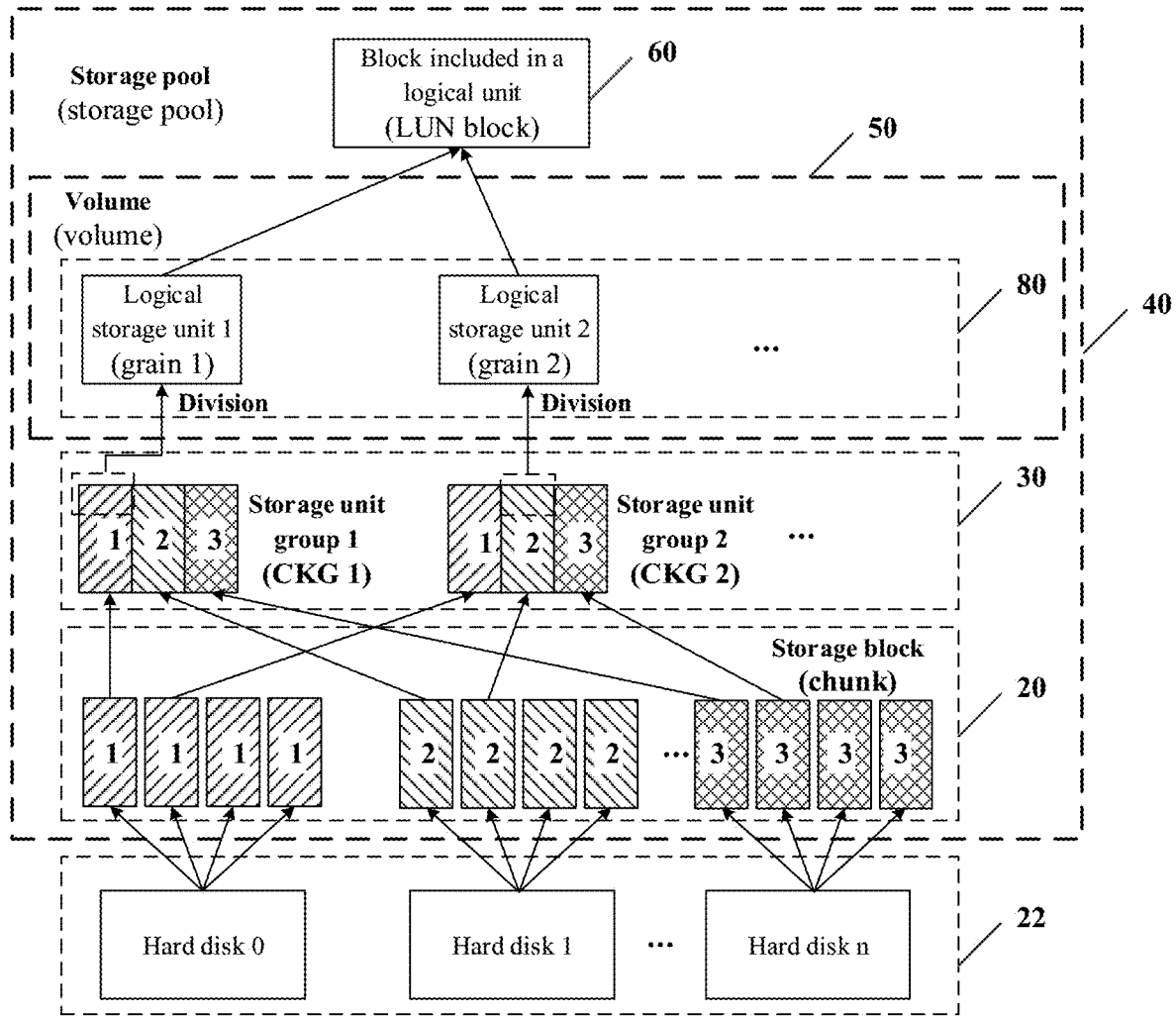
FIG. 3 is a schematic architectural diagram of a storage device according to an implementation of this application.

FIG. 3 is a schematic architectural diagram of a storage device according to an implementation of this application. As shown in FIG. 3, (n+1) hard disks in a solid-state disk 22 in this implementation of this application may be hard disks of a same type, and the hard disk of this type is specifically, for example, a hard disk of an SSD type, a hard disk of an SATA type, or a hard disk of a SAS type. The solid-state disk 22 is a physical hard disk, and provides a storage resource in a unified manner.

As shown in FIG. 3, the storage device may divide the solid-state disk 22 into a plurality of continuous storage space with a fixed size. The storage space with the fixed size may be a memory block (to be specific, a chunk) 20, and a size of the CK 20 may be fixed to 4 MB, but is not limited to 4 MB, or may be another fixed size.

The CK 20 can form a storage unit group (to be specific, a chunk group) 30 according to a RAID policy. The CKG 30 may be a logical storage unit formed, based on a RAID algorithm, by a plurality of CKs 20 of different disks randomly selected from the solid-state disk 22. Specifically, memory blocks from different solid-state disks may form a storage unit set, and the controller 11 further divides the memory blocks in the storage unit set into a data group and a check group based on a preset RAID type. The data group includes at least two memory blocks used to store data, and the check group includes at least one memory block used to store check data in the data. In this implementation, the storage unit set including the data group and the check group is referred to as the CKG 30, namely, the storage unit group. When the controller 11 fills the memory 111 with data of a specific size, the controller 11 may divide the data into a plurality of data units based on the preset RAID type, obtain through calculation a check unit, and send the data unit and the check unit to the solid-state disk, to store the data unit and the check unit into the CKG 30. Each memory block in the data group is used to store a data unit, and each memory block in the check group is used to store a check unit. After the storage, these data units and corresponding check units form a storage unit. The storage unit group may include a plurality of storage units, and the storage unit may be a stripe of the storage unit group.

The storage unit may include a data unit and a check unit. In this implementation, that a size of the storage unit is 8 KB is used as an example, but is not limited to 8 KB. As shown in FIG. 3, the storage unit is fixed-sized logical storage space whose CKG 30 is divided into a finer granularity, and the storage unit may be a logical storage unit (to be specific, a grain) 80. The CKG 30 may be divided into stripes. A stripe unit obtained by dividing the stripes includes the logical storage unit grain 80, and a size of the grain 80 may be set by a user based on a service requirement. The CKG 30 may be used as a data access temperature statistics collection and migration unit, and the grain 80 may also be used as a data access temperature statistics collection and migration unit.

CKs in each CKG 30 come from disks of a same type. When the CKG 30 is used as a data access temperature statistics collection and migration unit, and when it is detected that data access temperature of the CKG 1 reaches a specified threshold, data stored in the CKG 1 may be migrated to a CKG with higher access performance. For example, the CK in the CKG 30 shown in FIG. 3 comes from an SAS hard disk. When it is detected that the data access temperature of the CKG 1 reaches the specified threshold, it indicates that the data stored in the CKG 1 needs to be stored into CKG with higher access performance, and the data stored in the CKG 1 may be migrated to the CKG that comes from the SSD. When it is detected that the data access temperature of the CKG 1 is lower than a second specified threshold, it indicates that the data stored in the CKG 1 needs to be stored in CKG with lower access performance, and the data stored in the CKG 1 may be migrated to CKG that comes from an SATA. The data access performance may include a latency, an access speed, and the like.

As shown in FIG. 3, this implementation of this application is described by using an example in which a storage unit is the grain 80. It may be understood that the example is merely used to explain this implementation of this application, and should not constitute a limitation. In addition, a system architecture shown in FIG. 3 is merely used to explain this implementation of this application, and should not constitute a limitation. The storage system architecture in this implementation of this application may further be extended to another architecture. For example, based on the architecture shown in FIG. 3, the CKG 30 may obtain an extent through striping, the extent may be divided into grains 80, and the grains 80 may be used as storage units to form an LUN block 60. In other words, a composition unit of the LUN block 60 is the grain 80.

The system architecture shown in FIG. 3 is described by using an example in which a stripe of the CKG 30 is divided into stripe units, and the stripe unit includes a fixed-sized logical storage unit grain 80. It may be understood that the system architecture is not limited to the division method, and this implementation of this application is also applicable to another division method.

As shown in FIG. 3, it is assumed that one memory block 20 is selected from each of three solid-state disks to form a storage unit group 30, and then the controller 11 groups memory blocks in the storage unit group 30 based on a RAID type (for example, RAID 6). For example, a memory block 1 and a memory block 2 are a data block group, and a memory block 3 is a check block group. When a size of data stored in the memory 111 reaches 16 KB (8 KB×2), the data is divided into two data units, and each data unit has a size of 8 KB. One check unit is obtained through calculation, and each check unit also has a size of 8 KB. The controller 11 sends the data units and the check units to the solid-state disk, and stores the data units and the check units into the storage unit group (as shown by the CKG 1 or a CKG 2 in FIG. 3). It may be understood that, according to a redundancy protection mechanism of the RAID 6, when any data unit or check unit is invalid, an invalid unit may be reconstructed based on a remaining data unit or check unit.

In this implementation, when the memory 111 is filled with data whose size is equal to a size of one storage unit, the controller 11 sends a data write instruction to the solid-state disk group, so that the solid-state disk 22 included in the solid-state disk group writes the data into the storage unit of the CKG 30. In this case, the controller 11 needs to determine whether there is an allocated CKG 30. If there is an allocated CKG 30, and if the CKG 30 still has sufficient space for accommodating the data, the controller 11 may instruct the solid-state disk group to write the data into the allocated CKG 30. Specifically, the controller 11 obtains an unused logical address from a logical address range of the allocated CKG 30, adds the logical address to the data write instruction, and sends the data write instruction to the solid-state disk 22. After storing the data, the solid-state disk 22 creates, at a flash translation layer, a mapping relationship between the logical address and an actual address for storing the data.

In the foregoing example, if the controller 11 determines that there is no allocated CKG 30 in the system, or all allocated CKGs 30 are filled with data, the controller 11 needs to create a new CKG 30. A creation process of the CKG 30 may be: The controller 11 determines, based on a record of the controller 11 regarding available space of each solid-state disk, that remaining space of the system is sufficient to create a new CKG 30. Next, the controller 11 obtains one CK 20 from each of different solid-state disks 22, and forms one new CKG 30 based on a preset RAID type by using the CKs 20 (referring to the foregoing description of the storage unit group). Then, the controller 11 allocates a segment of logical address to each CK 20, and a set of the logical address segments is a logical address of the new CKG 30.

The solid-state disk 22 may be configured to create a plurality of storage pools 40. The storage pool 40 is created on the solid-state disk 22, and is a hard disk subset of the solid-state disk 22. A size, a type, and a capacity of each storage pool 40 may be specified by a user. The CKG 30 is a minimum unit in which the storage pool 40 obtains an allocated resource from the solid-state disk 22. The storage pool 40 includes a plurality of CKGs 30 from one or more storage media. The CK 20 and the CKG 30 are internal objects inside a storage device, and are configured by the storage device and are not present to users.

A managed object in the storage device is a volume 50. One volume 50 is used to organize all storage units of a logical unit number (LUN), and the storage unit includes a grain.

An LUN is logical storage space that can be directly mapped to a host for read and write, and is a logical unit. The LUN is an external representation of the volume 50. Data stored in the LUN may be migrated to different storage tiers in the storage pool 40 based on data access temperature. An LUN block 60 is a small block divided from a logical block address (LBA) in a logical address space of the LUN. The LUN block 60 may include a plurality of storage units in the storage pool 40. A composition unit of a block included in the logical unit is a storage unit. The plurality of storage units may be different storage media, and may be from different storage unit groups. Therefore, the LUN block 60 can enable a plurality of hard disks to read and write data at the same time, thereby increasing a response speed and improving efficiency and performance.

It may be understood that names of the foregoing memory block, storage unit group, storage unit, logical unit, and the like are not limited in this implementation of this application, and there may be other names in the field of storage technologies. In addition, the system architecture described in FIG. 3 is not limited, and the implementations of the application are also applicable to another similar application scenario and system architecture.

In the hierarchical storage technology, data may be migrated in a form of CKGs. During data migration, whether data is migrated to a CKG with higher data access performance or a CKG with lower data access performance may be determined based on data access temperature of the CKG. When statistics about data access temperature is collected, how to ensure accuracy of collecting statistics about data access temperature of the CKG is an issue to be urgently resolved.

Based on the foregoing application scenario and system architecture, to improve accuracy of collecting statistics about data access temperature of a storage unit group, the implementations of the application provide a data migration method and an apparatus.

In the data migration method, first, the storage device may collect statistics about data access temperature of LUN blocks that are accessible by a host. Second, for each LUN block, the storage device may mark, based on the data access temperature of the LUN block, data access temperature of storage units that form the LUN block. Then, the storage device may determine data access temperature of a storage unit group based on data access temperature of storage units that form the storage unit group. Finally, when it is detected that the data access temperature of the storage unit group reaches a specified threshold, the storage device migrates data in the storage unit group to a storage unit group with higher access performance. Alternatively, when it is detected that the data access temperature of the storage unit group is less than a second specified threshold, the storage device may migrate data in the storage unit group to a storage unit group with lower access performance.

In the foregoing data migration method, the data access temperature of the storage units that form the LUN block is determined by collecting statistics about the data access temperature of the LUN block. The data access temperature of the storage unit group may be determined based on data access temperature of each storage unit included in the storage unit group. In this way, the determined data access temperature of the storage unit group can reflect a data access frequency of the storage unit group more accurately, thereby improving accuracy of collecting statistics about the data access temperature of the storage unit group and improving hierarchical storage performance of the storage device.

For example, an implementation of this application provides a data migration method, which can improve data migration accuracy. FIG. 4 is a schematic flowchart of a data migration method according to an implementation of this application. The data migration method includes but is not limited to steps S101 and S102.

S101: A storage device obtains data access temperature of a first storage unit group.

S102: When the data access temperature of the first storage unit group reaches a specified threshold, the storage device migrates data in the first storage unit group to a second storage unit group.

The data access temperature of the first storage unit group is determined by data access temperature of each storage unit, and the data access temperature of each storage unit is determined by a logical unit in which the storage unit is located. In this implementation of this application, the first storage unit group may be any storage unit group in the storage device. For descriptions of blocks included in the storage unit group, the storage unit, and the logical unit, refer to specific descriptions of the system architecture described in FIG. 3. The blocks included in the storage unit group, the storage unit, and the logical unit may be sequentially the CKG, the grain, and the LUN block in the system architecture described in FIG. 3. Details are not described again.

The storage device may collect statistics about the data access temperature in a form of blocks included in a logical unit. The following specifically describes how to determine the data access temperature of the first storage unit group. The determining the data access temperature of the first storage unit group may include the following steps.

Step 1: The storage device collects statistics about data access frequencies of all LUN blocks.

Specifically, because a LUN is logical storage space that is directly mapped to a host and that is directly visible to a user, the storage device collects statistics about the data access frequencies in a form of blocks included in a logical unit. Specifically, statistics about a quantity of times of reading or writing data of a block included in each logical unit is collected by using the block included in the logical unit as a monitoring object. In addition, because the data access frequency may change with time, the storage device may periodically collect statistics about the data access frequency.

Step 2: The storage device determines data access temperature of each LUN block based on a data access frequency of each LUN block.

Step 3: The storage device determines data access temperature of a storage unit included in each LUN block.

Step 4: For each storage unit group, the storage device determines the data access temperature of the storage unit group based on data access temperature of each storage unit included in the storage unit group.

The data access temperature may be used to represent the data access frequency of the LUN block. How to determine the data access temperature based on the data access frequency is not specifically limited in this implementation of this application. The following describes an example of a specific implementation. It may be understood that the example is merely used to explain this implementation of this application, and should not constitute a limitation.

Figure 5:
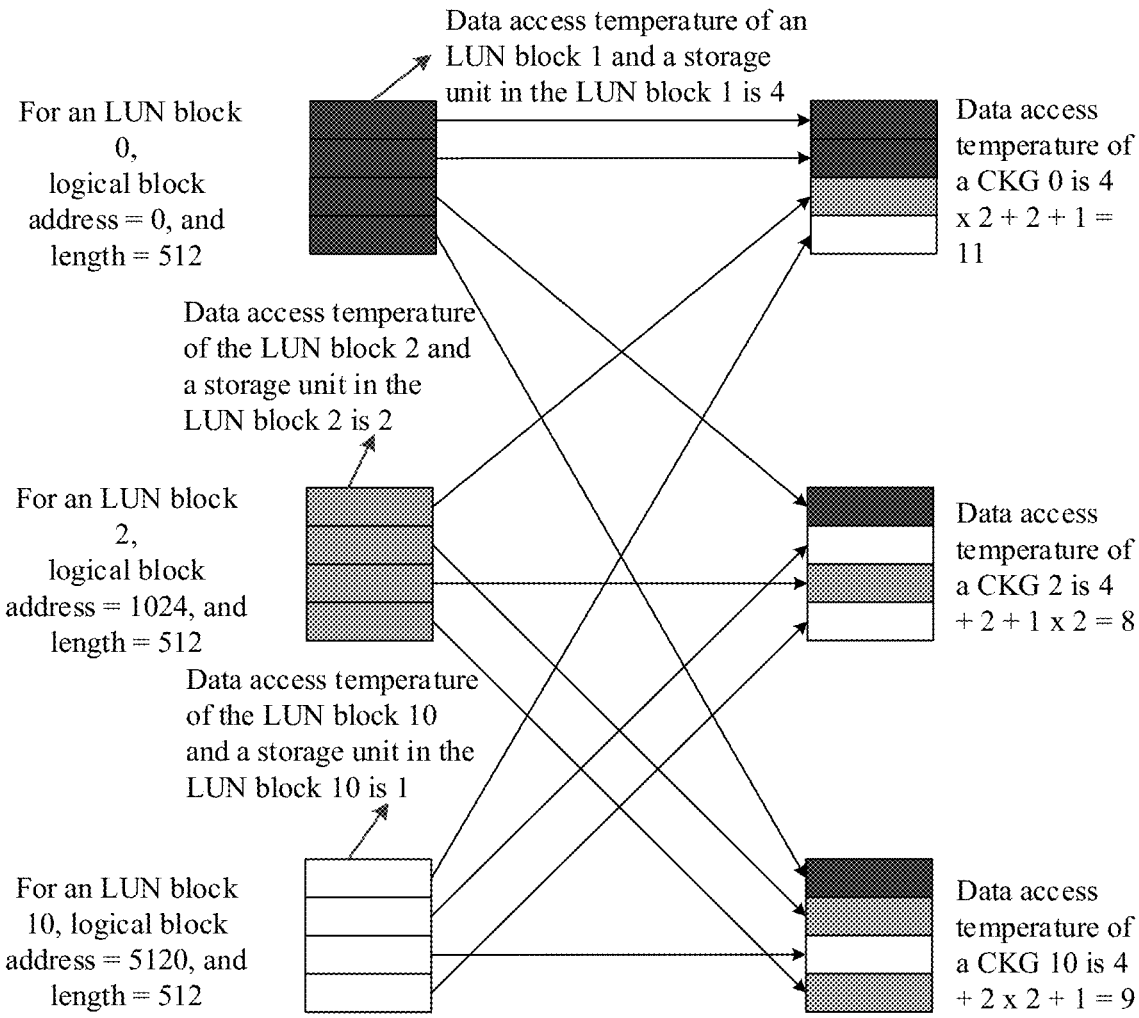
FIG. 5 is a schematic diagram of a method for determining data access temperature of a storage unit group according to an implementation of this application.

Referring to FIG. 5 and Table 1, FIG. 5 is a schematic diagram of a method for determining data access temperature of a storage unit group according to an implementation of this application. Table 1 is an example of determining data access temperature of an LUN block according to an implementation of this application.

TABLE 1

Example for determining data access temperature of an LUN block

|  | Data access frequency | Data access temperature |
| --- | --- | --- |
| LUN block 0 | 500 | 4 |
| LUN block 2 | 200 | 2 |
| LUN block 10 | 100 | 1 |
| ... | ... | ... |

As shown in Table 1, the data access temperature may be used to represent a data access frequency of a LUN block. A larger data access frequency indicates higher data access temperature. Specifically, for example, the data access temperature may be obtained based on the data access frequency in a mapping manner. In other words, a data access frequency in a preset range corresponds to one data access temperature, it is determined that a data access frequency of a LUN block falls in a data access frequency range, and data access temperature corresponding to the data access frequency range in the mapping table is obtained by searching the mapping table. It may be understood that the foregoing data access temperature determining method is not limited, or may be implemented by using another algorithm.

In specific implementation, the data access temperature of the LUN block may also be obtained by directly collecting statistics for the LUN block. For example, statistics about the data access frequency of the LUN block is directly collected as the data access temperature of the LUN block. In other words, after step 1 is performed, step 2 does not need to be performed, and step 3 is directly performed based on the obtained data access temperature.

As shown in FIG. 5, after determining data access temperature of each LUN block, the storage device may determine data access temperature of a storage unit included in the LUN block as the data access temperature of the corresponding LUN block. As shown in FIG. 5, for a LUN block 0, the storage device may mark data access temperature of each storage unit included in the LUN block 0 as 4. For a LUN block 2, the storage device may mark data access temperature of each storage unit included in the LUN block 2 as 2. For a LUN block 10, the storage device may mark data access temperature of each storage unit included in the LUN block 10 as 1.

After the data access temperature of each composition unit (storage unit) of each LUN block is determined, data access temperature of each storage unit group may be determined. Specifically, as shown in FIG. 5, for a CKG 0, data access temperature of the CKG 0 is the sum of data access temperature of the four storage units included in the CKG 0, that is, 4×2+2+1=11. For a CKG 2, data access temperature of the CKG 2 is the sum of data access temperature of four storage units included in the CKG 2, that is, 4+2+1×2=8. For a CKG 10, data access temperature of the CKG 10 is the sum of data access temperature of four storage units included in the CKG 10, that is, 4+2×2+1=9. Therefore, the data access temperature of each of the CKG 0, the CKG 2, and the CKG 10 is obtained, and the storage device may determine, based on the data access temperature of each CKG, whether to migrate data. For the storage unit, the storage unit group, and the logical unit, refer to specific descriptions of the system architecture described in FIG. 3. Details are not described again.

It may be understood that the foregoing process of determining the data access temperature of the storage unit group is merely used as an example to explain this implementation of this application, and should not constitute a limitation. In specific implementation, another method may also be used. For example, when data access temperature of each storage unit included in the LUN block 10 is determined based on the LUN block 10, a value may also be assigned to the data access temperature of the storage unit included in the LUN block 10. For another example, when data access temperature of a storage unit group is determined based on data access temperature of a storage unit, a method different from summation of the data access temperature may be used. This is not limited in this implementation of this application.

After obtaining the data access temperature of the first storage unit group, the storage device may detect a value relationship between the data access temperature of the first storage unit group and a specified threshold. When the data access temperature of the first storage unit group reaches a specified threshold (first specified threshold), it indicates that the data in the first storage unit group needs to be migrated to a storage unit group with higher access performance. The storage device may migrate data in the first storage unit group to a second storage unit group, and access performance of the second storage unit group is higher than access performance of the first storage unit group. When the data access temperature of the first storage unit group is less than a second specified threshold, it indicates that the data in the first storage unit group needs to be migrated to a storage unit group with lower access performance. The storage device may migrate data in the first storage unit group to a fifth storage unit group, and access performance of the fifth storage unit group is lower than access performance of the first storage unit group.

The first specified threshold and the second specified threshold may be equal or not equal. This is not limited in this implementation of this application. The data access performance of the storage unit may include a latency, an access speed, and the like.

In the foregoing data migration method, hot data frequently accessed by a user may be stored in a low-latency and high-speed storage medium, and cold data rarely accessed may be stored in a high-latency and low-cost storage medium. In this way, disk utilization can be improved through hierarchical storage. In addition, the data access temperature of the LUN block is determined by collecting statistics about the data access frequency of the LUN block, and then the data access temperature of the storage unit that forms the LUN block is determined based on the data access temperature of the LUN block. The data access temperature of the storage unit group may be determined based on the data access temperature of each storage unit included in the storage unit group. In this way, the determined data access temperature of the storage unit group can reflect a data access frequency of the storage unit group more accurately, thereby improving data migration appropriateness and improving hierarchical storage performance of the storage device.

During data storage, a redirect-on-write (ROW) technology can be used to back up data at a specific time point. The following describes the ROW technology in detail.

During ROW, a snapshot is first created for a data volume. The snapshot may be a fully available copy of a specified data set. The copy includes an image of the dataset at a specific time point, and the data set is a set of data stored in the data volume. The snapshot may be a snapshot volume corresponding to the data volume, and the data volume may also be referred to as a source volume. After write requests are received in the data volume, a write request for a specific storage unit in the data volume may be redirected to a reserved storage unit in the snapshot volume, and the data that requests to be written is written into the snapshot volume. Specifically, during a write operation, an upper-layer service requests to write data into the snapshot volume. When the data is queued in a cache, if it is determined that a logical address into which the data is to be written is a logical address of the data volume, the data is redirected and written into a reserved logical address in the snapshot volume, and an actual address of the data and the logical address in the snapshot volume are written into a mapping table. When the upper-layer service requests to read the data volume, data obtained before the snapshot is created is read from the source volume, and data written after the snapshot is created is read from the snapshot volume.

The ROW may be implemented in a form of storage units, in other words, a storage unit in the data volume is corresponding to one storage unit in the snapshot volume. When a write operation is performed on a storage unit in the data volume, the data that requests to be written is written into a corresponding storage unit in the snapshot volume. A mapping relationship is established between a logical address of the storage unit in the data volume and a logical address of the storage unit in the corresponding snapshot volume.

In an ROW scenario, the first storage unit group may include a first storage unit, and the storage device may receive a data write request. The data write request is used to write data into a second storage unit. A storage unit group to which the second storage unit belongs is different from the first storage unit group, and the storage unit group to which the second storage unit belongs may be a third storage unit group. The storage device may write the data into the first storage unit through the ROW, and store a correspondence between an actual address of the data and a logical address in the first storage unit. In the ROW scenario, step S101 may be specifically implemented as follows: The storage device updates the data access temperature of the first storage unit based on the data access temperature of the second storage unit, and then the storage device obtains the data access temperature of the first storage unit group according based on updated data access temperature of the first storage unit.

Figure 6:
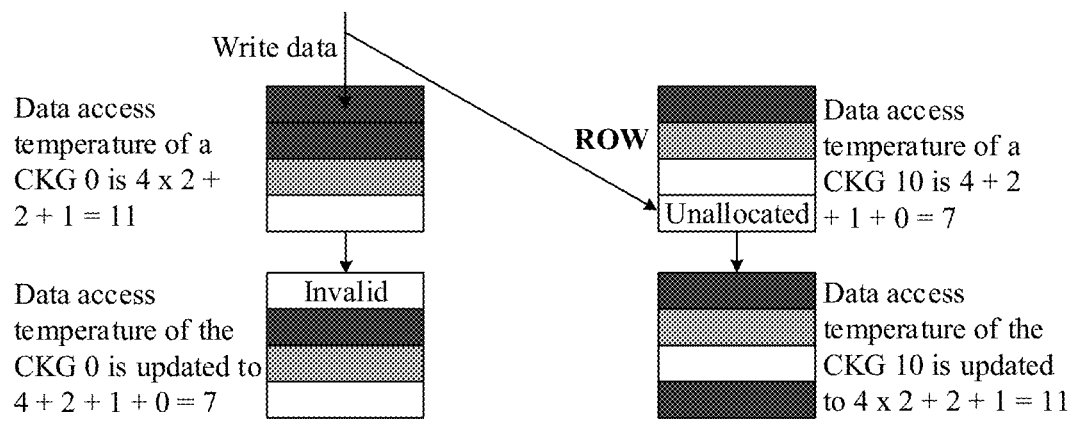
FIG. 6 is a schematic diagram of another method for determining data access temperature of a storage unit group according to an implementation of this application.

For example, FIG. 6 is a schematic diagram of another method for determining data access temperature of a storage unit group according to an implementation of this application. As shown in FIG. 6, an example in which the second storage unit is a storage unit in the CKG 0 and the first storage unit is a storage unit in the CKG 10 is used. Data access temperature of the second storage unit before being redirected is 4; and the first storage unit is an unallocated storage unit in the CKG 10, and therefore the data access temperature of the first storage unit is 0. Data access temperature of the third storage unit group (CKG 1) in which the second storage unit is located may be the sum of data access temperature of all storage units included in the third storage unit group, in other words, 4×2+2+1=11. The data access temperature of the first storage unit group (CKG 10) in which the first storage unit is located may be the sum of data access temperature of all storage units included in the first storage unit group, in other words, 4+2+1=7.

As shown in FIG. 6, after the write operation of the second storage unit is redirected to the first storage unit through the ROW, the data access temperature of the first storage unit may use the data access temperature of the second storage unit. In other words, the data access temperature, 4, of the second storage unit is updated to the data access temperature of the first storage unit, to obtain the data access temperature, 4, of the first storage unit. After the data access temperature of the first storage unit is updated, the data access temperature of the storage unit group CKG 10 in which the first storage unit is located also needs to be updated based on the updated data access temperature of the first storage unit. As shown in FIG. 6, the data access temperature of the first storage unit group CKG 10 is updated to 4×2+2+1=11.

It may be understood that the example shown in FIG. 6 is merely used to explain this implementation of this application, and should not constitute a limitation.

In the foregoing ROW scenario, the data access temperature of the redirected-to first storage unit may use the data access temperature of the second storage unit that is used before redirection. The data access temperature of the storage unit group in which the first storage unit is located is updated based on the used data access temperature of the first storage unit. Whether the data is migrated is determined based on the updated data access temperature of the storage unit group. The method for determining the data access temperature of the storage unit group may avoid inaccurate data access temperature, caused by the ROW, of the storage unit group in which the first storage unit is located. This ensures that statistics about the data access temperature of the storage unit group is collected more accurately, and can improve data migration appropriateness, thereby improving hierarchical storage performance of the storage device.

In another aspect, after the write operation of the second storage unit is redirected to the first storage unit through the ROW, the data access temperature of the second storage unit may be reset when the second storage unit is released. As shown in FIG. 6, after the second storage unit is recycled (in other words, the stored data is cleared), for a storage unit group in which the second storage unit is located, the second storage unit temporarily does not store data. Therefore, the second storage unit does not contribute to the data access temperature of the third storage unit group CKG 0. In this case, the data access temperature of the third storage unit group CKG 0 that needs to be updated again is 4+2+1+0=7.

After the data access temperature of the third storage unit is updated, the storage device may migrate data based on updated data access temperature of the third storage unit. Specifically, the storage device may detect a value relationship between the updated data access temperature of the third storage unit group and a specified threshold. When the data access temperature of the third storage unit group reaches a specified threshold (third specified threshold), it indicates that the data in the third storage unit group needs to be migrated to a storage unit group with higher access performance. The storage device may migrate the data in the third storage unit group to a fourth storage unit group, and access performance of the fourth storage unit group is higher than access performance of the third storage unit group.

When the data access temperature of the third storage unit group is less than a fourth specified threshold, it indicates that the data in the third storage unit group needs to be migrated to a storage unit group with lower access performance. The storage device may migrate the data in the third storage unit group to a sixth storage unit group, and access performance of the sixth storage unit group is lower than access performance of the third storage unit group.

The third specified threshold and the fourth specified threshold may be equal or not equal. This is not limited in this implementation of this application. It may be understood that the foregoing ROW scenario is not limited in this implementation of this application. As long as storage units in a storage unit group are released, data access temperature of each of the released storage units is reset. Data access temperature of the storage unit group is updated based on the reset data access temperature of the storage units, and data is migrated based on updated data access temperature of the storage unit group.

After the data in the storage unit in the storage unit group is released, the data access temperature of the redirected storage unit is reset, and the data access temperature of the storage unit group in which the storage unit is located is updated based on the reset data access temperature of the storage unit. The method for determining the data access temperature of the storage unit group may avoid inaccurate data access temperature of the storage unit group caused by releasing the data in the storage unit. This ensures that statistics about the data access temperature of the storage unit group is collected more accurately, and can improve data migration appropriateness, thereby improving hierarchical storage performance of the storage device.

The foregoing describes the methods in the implementations of this application in detail. The following provides apparatuses according to the implementations of this application.

Figure 7:
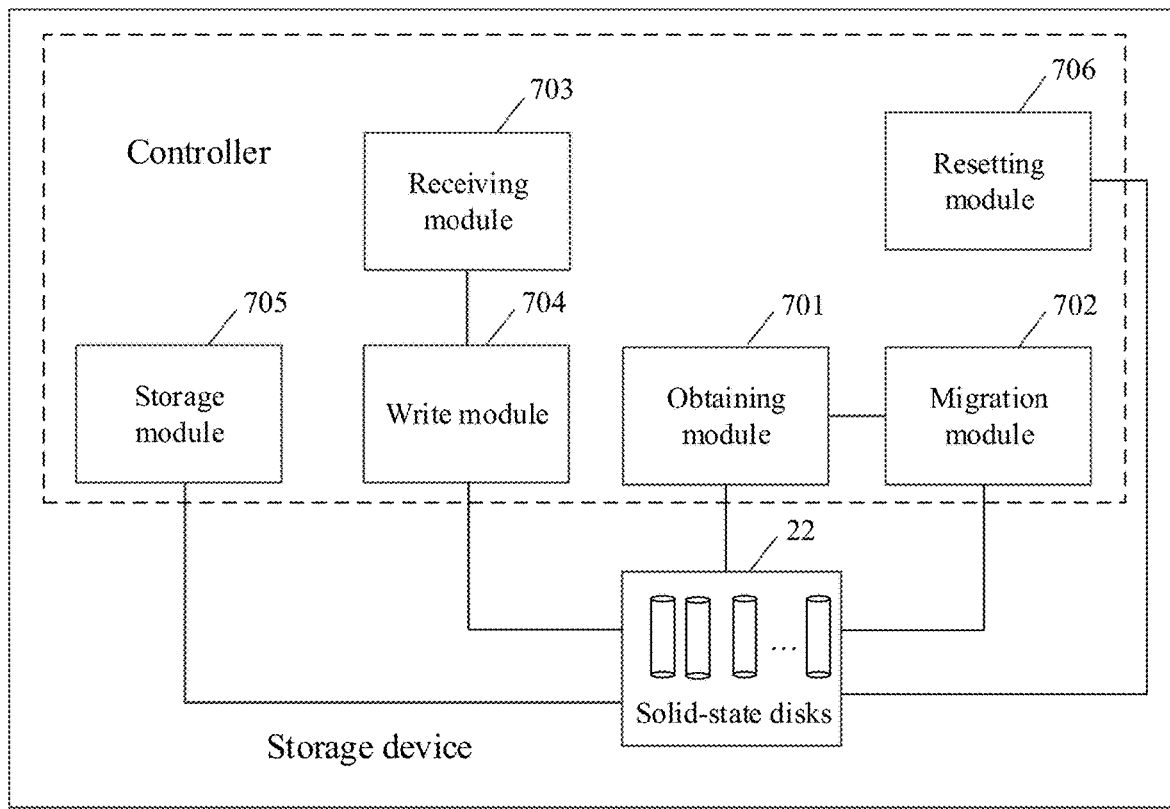
FIG. 7 is a schematic structural diagram of another storage device according to an implementation of this application.

FIG. 7 is a schematic structural diagram of another storage device according to an implementation of this application. As shown in FIG. 7, the storage device may include an obtaining module 701 and a migration module 702.

The obtaining module 701 is configured to obtain data access temperature of a first storage unit group. The first storage unit group includes a plurality of storage units, each storage unit is a composition unit of a block included in a logical unit, the logical unit is logical storage space that is provided by the storage device and that is accessible by a host, the data access temperature of the first storage unit group is determined by data access temperature of each storage unit, and the data access temperature of each storage unit is determined by a logical unit in which the storage unit is located. For descriptions of the function of the obtaining module 701, refer to the specific description of S101 in the implementation described in FIG. 4. Details are not described again.

The migration module 702 is configured to: when the data access temperature of the first storage unit group reaches a specified threshold, migrate data in the first storage unit group to a second storage unit group. Access performance of the second storage unit group is higher than access performance of the first storage unit group. For descriptions of the function of the migration module 702, refer to the specific description of S102 in the implementation described in FIG. 4. Details are not described again.

For descriptions of blocks included in the storage unit group, the storage unit, and the logical unit, refer to specific descriptions of the system architecture described in FIG. 3. The blocks included in the storage unit group, the storage unit, and the logical unit may be sequentially the CKG, the grain, and the LUN block in the system architecture described in FIG. 3. Details are not described again.

In a possible implementation, the storage device collects statistics about the data access temperature in a form of blocks included in the logical unit. For specific descriptions of determining the data access temperature of the first storage unit group, refer to descriptions of step 1 to step 4 in the implementation described in FIG. 4. Details are not described again.

In a possible implementation, the first storage unit group includes a first storage unit, and the storage device further includes a receiving module 703, a write module 704, and a storage module 705.

The receiving module 703 is configured to receive a data write request. The data write request is used to write data into a second storage unit, and a storage unit group to which the second storage unit belongs is different from the first storage unit group.

The write module 704 is configured to write the data into the first storage unit.

The storage module 705 is configured to store a correspondence between an actual address of the data and a logical address of the first storage unit.

For descriptions of the receiving module 703, the write module 704, and the storage module 705, refer to the description of the ROW scenario in the implementation described in FIG. 4. Details are not described again.

The obtaining module 701 is specifically configured to: update data access temperature of the first storage unit based on data access temperature of the second storage unit, and obtain the data access temperature of the first storage unit group based on updated data access temperature of the first storage unit.

For descriptions of the function of the obtaining module 701 in the ROW scenario, refer to the description of the specific implementation of step S101 in the ROW scenario in the implementation described in FIG. 4. Details are not described again.

In a possible implementation, a third storage unit group includes the second storage unit, and the storage device further includes a resetting module 706, configured to: when the second storage unit is released, reset the data access temperature of the second storage unit. For descriptions of the function of the resetting module 706, refer to the specific description in the ROW scenario in the implementation described in FIG. 4 and the related description in FIG. 6. Details are not described again.

The obtaining module 701 is further configured to obtain data access temperature of the third storage unit group based on reset data access temperature of the second storage unit. For descriptions of the function of the obtaining module 701, refer to the description in step S101 and in the ROW scenario in the implementation described in FIG. 4 and the related description in FIG. 6. Details are not described again.

The migration module 702 is further configured to: when the data access temperature of the third storage unit group reaches a specified threshold, migrate data in the third storage unit group to a fourth storage unit group. Access performance of the fourth storage unit group is higher than access performance of the third storage unit group. For descriptions of the function of the migration module 702, refer to the specific description in step S102 and in the ROW scenario in the implementation described in FIG. 4. Details are not described again.

In this implementation, for functions of the modules, correspondingly refer to corresponding descriptions in the method implementation shown in FIG. 4. For blocks included in a storage unit group, a storage unit, and a logical unit in a solid-state disk 22, refer to specific descriptions of the storage system architecture described in FIG. 1 to FIG. 3. Details are not described again.

The obtaining module 701, the migration module 702, the receiving module 703, the write module 704, the storage module 705, and the resetting module 706 may all be implemented by the processor 112 described in FIG. 2, or by the processor 112 by invoking program code in the memory 111.

An implementation of this application provides a controller, configured to implement the controller in the storage device described in FIG. 7.

An implementation of this application further provides a computer readable storage medium. The computer readable storage medium stores an instruction. When the computer readable storage medium is run on a computer or a processor, the computer or the processor is enabled to perform one or more steps in any one of the foregoing methods. When the composition modules of the foregoing signal processing apparatus are implemented in the form of a software functional unit and sold or used as an independent product, the composition modules may be stored in the computer readable storage medium.

All or some of the foregoing implementations may be implemented by using software, hardware, firmware, or any combination thereof. When software is used to implement the implementations, all or some of the implementations may be implemented in the form of a computer program product. The computer program product includes one or more computer instructions. When the computer program instructions are loaded and executed on the computer, all or some of the procedures or functions according to the implementations of this application are generated. The computer instruction may be stored in the computer readable storage medium, or may be transmitted by using the computer readable storage medium. The computer may be a general-purpose computer, a special-purpose computer, a computer network, or another programmable apparatus. The computer readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person of ordinary skill in the art may understand that all or some of the processes of the methods in the foregoing implementations may be implemented by a computer program instructing relevant hardware. The program may be stored in the computer readable storage medium. When the program is run, the processes in the foregoing method implementations may be included. The foregoing storage medium includes any medium that can store program code, for example, a ROM, a random-access memory (RAM), a magnetic disk, or an optical disc.

What is claimed is:

1. A data migration method comprising:
   obtaining, by a storage device, data access temperature of a first storage unit group,
   wherein memory blocks from different solid-state disks form the first storage unit group, and the memory blocks are divided into a data group comprising at least two memory blocks for data and a check group comprising at least one memory block for check data in the data,
   wherein the first storage unit group comprises a plurality of storage units, each storage unit is divided into a finer granularity, the finer granularity makes a composition unit of a block, the block belongs to a logical unit, and the logical unit is logical storage space provided by the storage device and accessible by a host, and
   wherein the data access temperature of the first storage unit group is obtained by adding up data access temperature of a number of storage units within one of the blocks belonging to the first storage unit group multiplied by the number of storage units belonging to the one of the blocks of the first storage unit group, wherein each one of the blocks of the first storage unit group corresponds to a different logical block address, and the data access temperature of each storage unit which is determined by the storage device, is equal to data access temperature of the block belonging to the logical unit in which a storage unit is located;
   wherein the block is associated with a plurality of logical units, and each logical unit is associated with a plurality of storage unit groups to which the first storage unit group belongs;
   wherein statistics about a quantity of times of reading or writing data of the block is collected as a monitoring object to determine the data access temperature of the block; and
   in response to the data access temperature of the first storage unit group reaching a threshold, migrating, by the storage device, data in the first storage unit group to a second storage unit group, wherein access performance of the second storage unit group is higher than access performance of the first storage unit group.

2. The method according to claim 1, wherein the storage device collects the data access temperature by using the block belonging to the logical unit as a unit.

3. The method according to claim 1, wherein the first storage unit group comprises a first storage unit, and the method further comprises:
   receiving, by the storage device, a data write request, wherein the data write request is used to write data into a second storage unit, and a storage unit group to which the second storage unit belongs is different from the first storage unit group;
   writing, by the storage device, the data into the first storage unit, and storing a correspondence between an actual address of the data and a logical address of the first storage unit; and
   wherein the obtaining the data access temperature of the first storage unit group comprises:
   updating, by the storage device, data access temperature of the first storage unit based on data access temperature of the second storage unit; and
   obtaining, by the storage device, the data access temperature of the first storage unit group based on the updated data access temperature of the first storage unit.

4. The method according to claim 3, wherein a third storage unit group comprises the second storage unit, and the method further comprises:
   in response to the second storage unit being released, resetting, by the storage device, the data access temperature of the second storage unit;
   obtaining, by the storage device, data access temperature of the third storage unit group based on the reset data access temperature of the second storage unit; and
   in response to the data access temperature of the third storage unit group reaching a threshold, migrating, by the storage device, data in the third storage unit group to a fourth storage unit group, wherein access performance of the fourth storage unit group is higher than access performance of the third storage unit group.

5. A storage device, comprising a processor and a first storage unit group, wherein the first storage unit group comprises a plurality of storage units, each storage unit is divided into a finer granularity, the finer granularity makes a composition unit of a block, the block belongs to a logical unit, the logical unit is logical storage space provided by the storage device and accessible by a host, wherein the processor is configured to:
  obtain data access temperature of the first storage unit group,
  wherein memory blocks from different solid-state disks form the first storage unit group, and the memory blocks are divided into a data group comprising at least two memory blocks for data and a check group comprising at least one memory block for check data in the data,
  wherein the data access temperature of the first storage unit group is obtained by adding up data access temperature of a number of storage units within one of the blocks belonging to the first storage unit group multiplied by the number of storage units belonging to the one of the blocks of the first storage unit group, wherein each one of the blocks of the first storage unit group corresponds to a different logical block address, and the data access temperature of each storage unit which is determined by the storage device, is equal to data access temperature of the block belonging to the logical unit in which a storage unit is located;
  wherein the block is associated with a plurality of logical units, and each logical unit is associated with a plurality of storage unit groups to which the first storage unit group belongs;
  wherein statistics about a quantity of times of reading or writing data of the block is collected as a monitoring object to determine the data access temperature of the block; and
migrate data in the first storage unit group to a second storage unit group, wherein access performance of the second storage unit group is higher than access performance of the first storage unit group, in response to the data access temperature of the first storage unit group reaching a threshold.

6. The storage device according to claim 5, wherein the storage device collects the data access temperature by using the block belonging to the logical unit as a unit.

7. The storage device according to claim 5, wherein the first storage unit group comprises a first storage unit, and wherein the processor is further configured to receive a data write request, wherein the data write request is used to write data into a second storage unit, and a storage unit group to which the second storage unit belongs is different from the first storage unit group; and write the data into the first storage unit, and store a correspondence between an actual address of the data and a logical address of the first storage unit, and wherein the processor is further configured to:
  update data access temperature of the first storage unit based on data access temperature of the second storage unit; and
  obtain the data access temperature of the first storage unit group based on the updated data access temperature of the first storage unit.

8. The storage device according to claim 7, wherein a third storage unit group comprises the second storage unit, and the processor is further configured to:
  reset the data access temperature of the second storage unit, in response to the second storage unit being released;
  obtain data access temperature of the third storage unit group based on the reset data access temperature of the second storage unit; and
  migrate data in the third storage unit group to a fourth storage unit group, in response to the data access temperature of the third storage unit group reaching a threshold, wherein access performance of the fourth storage unit group is higher than access performance of the third storage unit group.

9. A non-transitory computer readable storage medium having stored thereon processor executable instructions which, when executed by a processor of a storage device, cause the processor to control the storage device to perform a method comprising:
  obtaining data access temperature of a first storage unit group,
  wherein memory blocks from different solid-state disks form the first storage unit group, and the memory blocks are divided into a data group comprising at least two memory blocks for data and a check group comprising at least one memory block for check data in the data,
  wherein the first storage unit group comprises a plurality of storage units, each storage unit is divided into a finer granularity, the finer granularity makes a composition unit of a block, the block belongs to a logical unit, and the logical unit is logical storage space provided by the storage device and accessible by a host, and
  wherein the data access temperature of the first storage unit group is obtained by adding up data access temperature of a number of storage units within one of the blocks belonging to the first storage unit group multiplied by the number of storage units belonging to the one of the blocks of the first storage unit group, wherein each one of the blocks of the first storage unit group corresponds to a different logical block address, and the data access temperature of each storage unit which is determined by the storage device, is equal to data access temperature of the block belonging to the logical unit in which a storage unit is located;
  wherein the block is associated with a plurality of logical units, and each logical unit is associated with a plurality of storage unit groups to which the first storage unit group belongs;
  wherein statistics about a quantity of times of reading or writing data of the block is collected as a monitoring object to determine the data access temperature of the block; and
in response to the data access temperature of the first storage unit group reaching a threshold, migrating data in the first storage unit group to a second storage unit group, wherein access performance of the second storage unit group is higher than access performance of the first storage unit group.

10. The non-transitory computer readable storage medium according to claim 9, wherein the storage device collects the data access temperature by using the block belonging to the logical unit as a unit.

11. The non-transitory computer readable storage medium according to claim 9, wherein the first storage unit group comprises a first storage unit, and the method further comprises:
  receiving a data write request, wherein the data write request is used to write data into a second storage unit, and a storage unit group to which the second storage unit belongs is different from the first storage unit group;

writing the data into the first storage unit, and storing a correspondence between an actual address of the data and a logical address of the first storage unit; and wherein the obtaining the data access temperature of the first storage unit group comprises:

updating data access temperature of the first storage unit based on data access temperature of the second storage unit; and obtaining the data access temperature of the first storage unit group based on the updated data access temperature of the first storage unit.

12. The non-transitory computer readable storage medium according to claim 11, wherein a third storage unit group comprises the second storage unit, and the method further comprises:

in response to the second storage unit being released, resetting the data access temperature of the second storage unit;

obtaining data access temperature of the third storage unit group based on reset data access temperature of the second storage unit; and in response to the data access temperature of the third storage unit group reaching a threshold, migrating data in the third storage unit group to a fourth storage unit group, wherein access performance of the fourth storage unit group is higher than access performance of the third storage unit group.

13. A controller of a storage device, comprising:

a processor; and a memory, having stored thereon processor executable instructions which, when executed by the processor of the controller, cause the controller to cooperate with the storage device to perform a method comprising:

obtaining data access temperature of a first storage unit group, wherein memory blocks from different solid-state disks form the first storage unit group, and the memory blocks are divided into a data group comprising at least two memory blocks for data and a check group comprising at least one memory block for check data in the data, wherein the first storage unit group comprises a plurality of storage units, each storage unit is divided into a finer granularity, the finer granularity makes a composition unit of a block, the block belongs to a logical unit, the logical unit is logical storage space provided by the storage device and accessible by a host, and wherein the data access temperature of the first storage unit group is obtained by adding up data access temperature of a number of storage units within one of the blocks belonging to the first storage unit group multiplied by the number of storage units belonging to the one of the blocks of the first storage unit group, wherein each one of the blocks of the first storage unit group corresponds to a different logical block address, and the data access temperature of each storage unit which is determined by the storage device, is equal to data access temperature of the block belonging to the logical unit in which a storage unit is located;

wherein the block is associated with a plurality of logical units, and each logical unit is associated with a plurality of storage unit groups to which the first storage unit group belongs;

wherein statistics about a quantity of times of reading or writing data of the block is collected as a monitoring object to determine the data access temperature of the block; and in response to the data access temperature of the first storage unit group reaching a threshold, migrating data in the first storage unit group to a second storage unit group, wherein access performance of the second storage unit group is higher than access performance of the first storage unit group.

14. The controller according to claim 13, wherein the storage device collects the data access temperature by using the block belonging to the logical unit as a unit.

15. The controller according to claim 13, wherein the first storage unit group comprises a first storage unit, and the method further comprises:

receiving a data write request, wherein the data write request is used to write data into a second storage unit, and a storage unit group to which the second storage unit belongs is different from the first storage unit group;

writing the data into the first storage unit, and storing a correspondence between an actual address of the data and a logical address of the first storage unit; and wherein the obtaining the data access temperature of the first storage unit group comprises:

updating data access temperature of the first storage unit based on data access temperature of the second storage unit; and obtaining the data access temperature of the first storage unit group based on the updated data access temperature of the first storage unit.

16. The controller according to claim 15, wherein a third storage unit group comprises the second storage unit, and the method further comprises:

in response to the second storage unit being released, resetting the data access temperature of the second storage unit;

obtaining data access temperature of the third storage unit group based on reset data access temperature of the second storage unit; and in response to the data access temperature of the third storage unit group reaching a threshold, migrating data in the third storage unit group to a fourth storage unit group, wherein access performance of the fourth storage unit group is higher than access performance of the third storage unit group.

* * * * *